United States Patent [19]

Ueda et al.

[11] 4,321,168

[45] Mar. 23, 1982

[54] PROCESS FOR PREPARING RUBBER COMPOSITION FOR TIRE TREADS

[75] Inventors: Akio Ueda, Yokohama; Shuichi Akita, Kamakura; Hiroshi Hirakawa, Isehara; Asahiro Ahagon, Hiratsuka, all of Japan

[73] Assignees: Nippon Zeon Co., Ltd.; The Yokohama Rubber Co., Ltd., both of Tokyo, Japan

[21] Appl. No.: 116,887

[22] Filed: Jan. 30, 1980

[30] Foreign Application Priority Data

Feb. 5, 1979 [JP] Japan .................................. 54/11388

[51] Int. Cl.³ ............................................... C08K 3/04
[52] U.S. Cl. .................................... 524/526; 523/351; 523/353; 525/236
[58] Field of Search ..................... 260/5, 42.32, 42.56, 260/42.54, 42.57; 525/236

[56] References Cited

U.S. PATENT DOCUMENTS

| | | | |
|---|---|---|---|
| 3,048,559 | 8/1962 | Heller et al. | 260/42.54 |
| 3,696,062 | 10/1972 | Lesage et al. | 260/5 |
| 3,725,331 | 4/1973 | Lesage et al. | 260/33.6 AQ |
| 3,978,165 | 8/1976 | Stumpe et al. | 260/894 |

FOREIGN PATENT DOCUMENTS

| | | | |
|---|---|---|---|
| 888996 | 2/1962 | United Kingdom | 260/42.56 |
| 1166832 | 10/1969 | United Kingdom . | |

*Primary Examiner*—Carman J. Seccuro
*Attorney, Agent, or Firm*—Sherman & Shalloway

[57] ABSTRACT

A process for preparing a tire tread rubber composition having improved rolling resistance and wet skid resistance comprising [I] 100 parts by weight of a rubber material composed of 25 to 75% by weight of substantially amorphous polybutadiene having a 1,2-bond unit content of 65 to 90 mole % and a Mooney viscosity ($ML_{1+4}$, 100° C.) of 20 to 100 and 75 to 25% by weight of natural rubber and/or cis-1,4-polyisoprene, and [II] 40 to 70 parts by weight of carbon black, said process comprising (1) mechanically compounding 40 to 60 parts by weight of the rubber material [I] with 40 to 70 parts by weight of carbon black [II], and then (2) adding to the resulting mixture the rubber material [I] in an amount sufficient to adjust the amount of the carbon black [II] to 40 to 70 parts by weight per 100 parts by weight of the rubber material [I] and mechanically compounding them.

8 Claims, No Drawings

PROCESS FOR PREPARING RUBBER COMPOSITION FOR TIRE TREADS

This invention relates to a new process for preparing a rubber composition for tire treads consisting basically of substantially amorphous polybutadiene having a high 1,2-bond unit content and natural rubber and/or cis-1,4-polyisoprene.

In recent years, the reduction of the rolling resistance of automobile tires and the increase of their wet skid resistance have been strongly desired in order to reduce fuel costs and secure safety in automobiles. It is generally thought that these properties of tires depend greatly on the dynamic viscoelastic characteristics of rubber materials of which the tire treads are made, and it is known that the aforesaid two properties of rubber materials are contradictory to each other [for example, Automobile Technology (a Japanese-language publication), Vol. 32, pages 417–420, 1978; Transaction of I.R.I., Vol. 40, pages 239–256, 1964].

To reduce the rolling resistance of a tire, the tread of the tire should be made of a rubber material that does not significantly cause a loss of wheel driving energy in the form of heat build up, etc. which is due to the load exerted on the road-contacting part of the tire and to the repeated deformation of the tire incident to its rotation. A dynamic loss property, such as rebound, measured in a test of rubber materials can be a measure of the rolling resistance of a tire. The rebound of the tire, however, should be determined at temperatures ranging from room temperature to about 70° C. in view of the running condition of an automobile. On the other hand, to increase the wet skid resistance of a tire, which is a braking property on a wet road surface and is important in regard to the safety of an automobile, the tread rubber material should maximize the energy loss in the form of the frictional resistance which occurs owing to the deformation of the rubber material which follows minute unevenness of a road surface when the tire is allowed to slide on the road surface with braking. To balance these viscoelastically contradictory properties, a blend of a styrene/butadiene copolymer rubber and polybutadiene having not more than 20 mole% of a 1,2-bond unit content has generally been used as a material for an automobile tire tread. When only a styrene/butadiene copolymer rubber having a bonded styrene content of 15 to 25% by weight, which is most generally used, is used, the wet skid resistance of a tire produced from it is good, but its rebound corresponding to rolling resistance is low. It is the general practice therefore to use a blend of it with 10 to 40% by weight of polybutadiene having a low 1,2-bond unit content which possesses high rebound and good abrasion resistance. This blend of styrene/butadiene copolymer and polybutadiene is not satisfactory in meeting the recent desire for reduced fuel consumption and increased safety. It has been desired therefore to develop a rubber material for tire treads which possesses a high level of the aforesaid two properties in a well balanced state.

It is an object of this invention to provide a tire tread rubber composition which meet these desires.

In order to achieve this object, the present inventors made a detailed study of various combinations of polybutadiene having a high 1,2-bond unit content and diene rubbers as described in U.S. Pat. Nos. 3,696,062 and 3,725,331 and British Pat. No. 1,261,371. As a result, they found that a rubber material composed of substantially amorphous polybutadiene having a high 1,2-bond unit content and natural rubber and/or high cis-1,4-polyisoprene with or without a diene rubber such as polybutadiene having a low 1,2-bond unit content have a good level of balance among the aforesaid two properties (rolling resistance and braking property) and abrasion resistance. Based on this discovery, the present inventors investigated methods for obtaining a tire tread rubber composition from the aforesaid rubber material. Their investigations have led to the discovery that a tire tread rubber composition comprising [I] a rubber material composed of 25 to 75% by weight of substantially amorphous polybutadiene having a 1,2-bond unit content of 65 to 90 mole% (to be sometimes referred to as "high 1,2-polybutadiene") and a Mooney viscosity ($ML_{1+4}$, 100° C.) of 20 to 100 and 75 to 25% by weight of natural rubber and/or cis-1,4-polyisoprene and [II] carbon black, which exhibits an unprecedented high level of rebound conducive to reduced fuel costs, and a good balance of wet skid resistance and abrasion resistance, can be prepared by a two-step compounding process which comprises (1) mechanically compounding 40 to 60 parts by weight of the rubber material [I] and 40 to 70 parts by weight of carbon black [II] in the optional presence of a process oil, and (2) adding to the resulting mixture the rubber material [I] in an amount sufficient to adjust the amount of the carbon black [II] to 40 to 70 parts by weight per 100 parts by weight of the rubber material [I], and compounding them with each other mechanically. It has been found surprisingly that by employing the two-step compounding process, the resulting composition has equal or higher wet skid resistance to or than a rubber composition obtained by an ordinary one-step compounding process in the prior art, and its rebound can be markedly increased without adversely affecting abrasion resistance.

In the first step of the process of this invention, the rubber material [I] is limited to one containing at least 25% of high 1,2-polybutadiene, and the proportions of the rubber material [I] and carbon black [II] are limited to 40–60 parts by weight, and 40–70 parts by weight, respectively. If the amount of the rubber material [I] is less than 40 parts by weight, it is difficult to mix it with the aforesaid amount of carbon black [II] at one time when a common mixer such as Banbury mixer or rolls is used. Moreover, heat generation at the time of compounding increases to cause scorching of the rubber compound, or carbon black cannot be well dispersed. If the high 1,2-polybutadiene content of the rubber material [I] is less than 25% by weight or the amount of the rubber material [I] exceeds 60 parts by weight, the compounding effect decreases. If desired, the compounding of the rubber material [I] and carbon black [II] may be performed in the presence of up to 40 parts by weight of a process oil. The presence of process oils will facilitate the compounding operation.

The high 1,2-polybutadiene used as one constituent of the rubber material [I] in this invention is substantially amorphous polybutadiene having a high 1,2-bond unit content which is obtained, for example, by the method disclosed in U.S. Pat. No. 3,301,840 which comprises polymerizing 1,3-butadiene in a hydrocarbon solvent at a temperature of $-80°$ C. to $+100°$ C. using an organolithium compound in the co-presence of a polar compound such as ethers or amines as an agent for controlling the amount of a 1,2-bond unit. The content of the 1,2-bond unit in this polymer is determined by an ordinary infrared spectroscopic method.

To achieve the object of this invention by using this substantially amorphous high 1,2-polybutadiene, it is necessary that its 1,2-bond unit content should be in the range of 65 to 90 mole%. If the 1,2-bond unit content is less than 65 mole%, the rebound of the rubber composition, which is a measure of rolling resistance, can be increased, but its wet skid resistance cannot be maintained at a level equal to or higher than conventional tire tread stocks. In other words, to maintain wet skid resistance at a level equal to or higher than conventional tread rubber compositions comprising a styrene/butadiene copolymer rubber as a main constituent, the 1,2-bond unit content of the polybutadiene should be at least 65 mole%. When the 1,2-bond unit content of the polybutadiene exceeds 90 mole%, the object of this invention cannot be achieved.

The high 1,2-polybutadiene suitably used in this invention has a Mooney viscosity ($ML_{1+4}$, 100° C.) of from 20 to 100. If the Mooney viscosity is less than 20, the vulcanization properties of the rubber composition are inferior, and if it is more than 100, the operation on a compounding mixer is troublesome. The preferred Mooney viscosity is from 30 to 80.

The amount of the high 1,2-polybutadiene used is 25 to 75% by weight based on the total rubber material [I]. If it is less than 25% by weight, the wet skid resistance of the resulting rubber composition is reduced. If it exceeds 75% by weight, its rebound is reduced greatly and its abrasion resistance is also reduced.

The other constituent constituting the rubber material [I] is natural rubber; cis-1,4-polyisoprene having a cis-1,4 bond unit content of at least 90 mole% obtained by solution polymerization of isoprene in the presence of a transition metal catalyst or an organo-alkali metal catalyst; or a blend of these. The amount of the natural rubber and/or cis-1,4-polyisoprene is 75 to 25% by weight based on the total weight of the rubber material. A marked increase in rebound cannot be expected if the amount of the other constituent is less than 25% by weight. If the amount of the other constituent exceeds 75% by weight, the wet skid resistance of the resulting composition cannot be maintained at a level equal to or higher than that of a tire tread composition consisting mainly of a styrene/butadiene copolymer.

A part, preferably up to 65% by weight, of the natural rubber and/or cis-1,4-polyisoprene may be replaced by a diene rubber. Examples of such diene rubbers include polybutadiene having a low 1,2-bond unit content obtained by solution polymerization of 1,3-butadiene; polybutadiene and a butadiene/styrene copolymer rubber obtained by solution polymerization of 1,3-butadiene or both 1,3-butadiene and styrene in the presence of an organo-alkali metal catalyst; and a butadiene/styrene copolymer rubber obtained by emulsion polymerization. When the proportion of the high 1,2-polybutadiene used is high, it may be partly replaced by such a diene rubber to inhibit the reduction of abrasion resistance without adversely affecting wet skid resistance. Cis-1,4-polybutadiene is especially suitable as the diene rubber. Replacement of more than 65% by weight of the natural rubber and/or cis-1,4-polyisoprene is undesirable because it will adversely affect the wet skid resistance of the resulting composition.

The rubber material [I] used in this invention may be partly or wholly oil-extended.

There is no particular restriction on the type of the carbon black [II] used in this invention if it is a carbon black usually employed in automobile tire treads. Examples include ISAF and HAF of various grades. The amount of the carbon black in the final composition is 40 to 70 parts by weight per 100 parts by weight of the rubber material [I]. If its amount is outside this range, it is difficult to meet the properties required of tire treads.

In order that a tread rubber composition consisting mainly of the rubber material [I] and carbon black [II] may exhibit the effects intended by this invention, it must be prepared by the two-step compounding process which comprises (1) mechancially compounding a part of the rubber material [I] (high 1,2-polybutadiene alone, or both high 1,2-polybutadiene and natural rubber and/or cis-1,4-polyisoprene rubber) with carbon black [II], and then (2) adding the remainder of the rubber material [I] to the mixture and compounding them with each other. The object of this invention cannot be achieved if there is used a two-step compounding process which comprises first compounding a rubber material not containing high-1,2-polybutadiene with carbon black, and then adding high 1,2-polybutadiene or the remainder of a rubber material containing it and compounding them with each other. The object of this invention can neither be achieved by a rubber composition having the same final composition as the composition of this invention if it is prepared by an ordinary one-step compounding process.

The characteristic feature of this invention consists in the performance of the special two-step compounding process, and the tread rubber composition consisting mainly of a specified rubber and carbon black obtained by the process of this invention has a wet skid resistance equal to or higher than that of a rubber composition of the same final composition prepared by an ordinary one-step compounding method, and a high rebound not seen in the composition obtained by the one-step compounding process. Accordingly, the tread rubber composition of this invention has these two properties in a well balanced state.

In the practice of the process of this invention, a part of the rubber material and carbon black may be compounded in the first step by using a conventional mixer such as a Banbury mixer or rolls, and immediately then, the remainder of the rubber material may be added to perform the second-step compounding operation. Alternatively, the second-step compounding may be performed after withdrawing the rubber composition obtained by the first step compounding operation from the mixer and then allowing it to stand for aging.

The effect of this invention can further be increased if a part or the whole of the amount of sulfur required in the final tire tread rubber composition is added in the first step of mechanically compounding the rubber material and carbon black. In this case, a vulcanization accelerator should not be added together with sulfur in order to prevent scorching. The temperature of the rubber compound at the end of the first-step compounding is desirably 100° to 170° C., especially 120° to 150° C. The amount of sulfur to be added is at least 10% by weight, preferably at least 50% by weight, of the required amount in consideration of the temperature of the rubber compound.

The rubber composition obtained by the process of this invention may contain various compounding agents widely used in the rubber industry, for example various process oils, sulfur, zinc oxide, vulcanization accelerators, vulcanization aids, anti-oxidants, and processing aids. Also, a controlling amount of carbon black may be added so long as it does not fall outside the range of carbon black added in the process of this invention.

The tire tread rubber composition obtained in the aforesaid manner is vulcanized by ordinary vulcanizing methods. The vulcanized product of the ruber composition in accordance with this invention can be distinguished from the vulcanized product of a rubber composition of the same composition as the present one but obtained by an ordinary one-step compounding process in that it possesses rebound and wet skid resistance in a well balanced state. It can also be distinguished from the latter in regard to the profiles of curves showing stress-strain behaviors, various properties such as tensile stress and hardness, the state of dispersion of carbon black determined by an optical or electron microscope, or electrical properties.

The tread rubber composition in accordance with this invention is fabricated into a tire by methods ordinarily practised in the tire industry which involve applying the composition to the tread portion of a preformed green base tire and molding it in a customary manner, or applying it to a base tire resulting from the removal of the worn tread portion from a used tire and molding it; and then vulcanizing it by an automatic vulcanizer for tires such as a Bag-O-Matic press. The resulting tire has rebound and wet skid resistance in a well balanced state.

The following Examples illustrate the present invention specifically. Unless otherwise specified, the content of a bond unit in a starting rubber material is expressed by mole%.

EXAMPLE 1

In accordance with a basic recipe shown in Table 1 for evaluation of a tire tread rubber composition, the material rubbers and compounding ingredients were compounded in a small-sized Banbury type mixer (0.8 liter in capacity) and 6-inch rolls to obtain rubber compositions.

As comparisons, compounds respectively containing as a starting rubber material cis-1,4-polybutadiene (cis-1,4-bond unit content 98%), a butadiene/styrene copolymer rubber (bound styrene content 23.5% by weight), natural rubber (RSS No. 3), cis-1,4-polyisoprene (cis-1,4 bond unit content 98%), and polybutadienes respectively having a 1,2-bond unit content of 50% ($ML_{1+4}$, 100° C.=51.5), 69% ($ML_{1+4}$, 100° C.=48.0), 76% ($ML_{1+4}$, 100° C.=50.5), 88% ($ML_{1+4}$, 100° C.=43.0) and 93% ($ML_{1+4}$, 100° C.=42.5), and blends (1:1 by weight) of each of these five 1,2-polybutadienes with cis-1,4-polyisoprene or natural rubber were each vulcanized at 160° C. for 15 to 25 minutes (press-vulcanization). The resulting vulcanized rubbers were each tested for rebound (Lüpke rebound test, at 25° C. and 70° C.), wet skid resistance (a portable skid tester of Stanley Company, 25° C., road surface: ASTM E303-74 (Outdoor type B made by 3M Company, black safety walk), Pico abrasion (a Goodrich-type Pico abrasion tester, ASTM D-2228), and tensile properties (tensile test JIS K-6301).

The polybutadiene samples having a 1,2-bond content of 50 to 93% used herein were prepared in accordance with an ordinary solution polymerization technique by polymerizing 1,3-butadiene at a temperature of 40° to 90° C. in cyclohexane using n-butyl lithium as a catalyst and ethylene glycol dimethyl ether as a 1,2-bond unit controlling agent.

TABLE 1

Basic recipe for a tire-tread composition

| Ingredients | Amounts (parts by weight) |
|---|---|
| Rubber material (see Tables 2 and 3) | 100 |
| Zinc oxide No. 3 | 3 |
| Stearic acid | 2 |
| Carbon black (HAF) | 50 |
| High aromatic oil | 5 |
| Sulfur (325 mesh) | variable |
| Vulcanization accelerator (*1) | variable |
| Anti-oxidant (*2) | 1 |

(*1): N-oxydiethylene-2-benzothiazole sulfenamide
(*2): N-phenyl-N-isopropyl-p-phenylenediamine

TABLE 2

| Run No. | \multicolumn{8}{c}{Comparison} |
|---|---|---|---|---|---|---|---|---|
|  | 1 | 2 | 3 | 4 | 5 | 6 | 7 | 8 |
| Compounding recipe | | | | | | | | |
| cis-1,4-Polybutadiene | 100 | — | — | — | — | — | — | — |
| Butadiene/styrene copolymer rubber | — | 100 | — | — | — | — | — | — |
| Natural rubber RSS No. 3 | — | — | 100 | — | — | — | — | — |
| cis-1,4-Polyisoprene | — | — | — | 100 | — | — | — | — |
| Polybutadiene with 50% 1,2-bond unit | — | — | — | — | 100 | — | — | — |
| Polybutadiene with 69% 1,2-bond unit | — | — | — | — | — | 100 | — | — |
| Polybutadiene with 76% 1,2-bond unit | — | — | — | — | — | — | 100 | — |
| Polybutadiene with 88% 1,2-bond unit | — | — | — | — | — | — | — | 100 |
| Polybutadiene with 93% 1,2-bond unit | — | — | — | — | — | — | — | — |
| Sulfur | 1.5 | 1.8 | 2.2 | 2.2 | 1.0 | 1.0 | 1.0 | 1.0 |
| Vulcanization accelerator | 1.1 | 1.1 | 0.8 | 0.8 | 2.0 | 2.0 | 2.0 | 2.0 |
| Properties of vulcanizates | | | | | | | | |
| Lupke rebound (%) at 25° C. | 58 | 50 | 57 | 54 | 52 | 48.5 | 45 | 36 |
| Lupke rebound (%) at 70° C. | 62 | 56 | 66 | 65 | 58 | 57 | 58 | 53 |
| Wet skid resistance at 25° C. | 62 | 77 | 73 | 73 | 72 | 77 | 80 | 83 |
| Pico abrasion ($\times 10^{-2}$ cm$^3$) | 0.82 | 1.75 | 3.05 | 3.20 | 2.00 | 3.02 | 3.40 | 3.78 |
| Tensile strength (kg/cm$^2$) | 144 | 248 | 272 | 256 | 153 | 165 | 156 | 159 |
| Elongation (%) | 420 | 470 | 520 | 550 | 410 | 460 | 410 | 400 |
| 300% tensile stress (kg/cm$^2$) | 89 | 139 | 143 | 110 | 101 | 93 | 104 | 108 |

| Run No. | \multicolumn{8}{c}{Comparison} |
|---|---|---|---|---|---|---|---|---|
|  | 9 | 10 | 11 | 12 | 13 | 14 | 15 | 16 |
| Compounding recipe | | | | | | | | |
| cis-1,4-Polybutadiene | — | — | — | — | — | — | — | 25 |
| Butadiene/styrene copolymer rubber | — | — | — | — | — | — | — | 75 |
| Natural rubber RSS No. 3 | — | — | — | — | — | — | 50 | — |

TABLE 2-continued

| | | | | | | | | |
|---|---|---|---|---|---|---|---|---|
| cis-1,4 Polyisoprene | — | 50 | 50 | 50 | 50 | 50 | — | — |
| Polybutadiene with 50% 1,2-bond unit | — | 50 | — | — | — | — | — | — |
| Polybutadiene with 69% 1,2-bond unit | — | — | 50 | — | — | — | — | — |
| Polybutadiene with 76% 1,2-bond unit | — | — | — | 50 | — | — | — | — |
| Polybutadiene with 88% 1,2-bond unit | — | — | — | — | 50 | — | 50 | — |
| Polybutadiene with 93% 1,2-bond unit | 100 | — | — | — | 13 | 50 | — | — |
| Sulfur | 1.0 | 1.6 | 1.6 | 1.6 | 1.6 | 1.6 | 1.6 | 1.7 |
| Vulcanization accelerator | 2.0 | 1.4 | 1.4 | 1.4 | 1.4 | 1.4 | 1.4 | 1.1 |
| Properties of vulcanizates | | | | | | | | |
| Lupke rebound (%) at 25° C. | 27 | 55 | 52 | 51 | 48.5 | 44 | 50 | 52 |
| Lupke rebound (%) at 70° C. | 50 | 63 | 59 | 59 | 60 | 60 | 60 | 59 |
| Wet skid resistance at 25° C. | 84 | 72 | 75 | 78 | 78 | 80 | 79 | 72 |
| Pico abrasion ($\times 10^{-2}$ cm$^3$) | 3.93 | 2.08 | 2.85 | 3.18 | 3.25 | 3.86 | 3.20 | 1.75 |
| Tensile strength (kg/cm$^2$) | 163 | 222 | 230 | 197 | 201 | 186 | 208 | 240 |
| Elongation (%) | 390 | 480 | 540 | 460 | 470 | 450 | 480 | 450 |
| 300% tensile stress (kg/cm$^2$) | 119 | 119 | 107 | 111 | 115 | 110 | 121 | 130 |

Separately, 50 parts by weight of a rubber material which was a 1:1 blend of each of polybutadienes having varying 1,2-bond unit contents and cis-1,4-polyisoprene or natural rubber (RSS No. 3) was compounded with the compounding ingredients shown in Table 1 (50 parts of HAF carbon black, 5 parts by weight of a high aromatic process oil, 3 parts by weight of zinc oxide No. 3, 2 parts by weight of stearic acid and 1 part by weight of anti-oxidant) in a small-sized Banbury type mixer for 2.5 minutes at 50° C. at a speed of 100 rpm (first-step compounding). Then, on a 6-inch roll mill (50° C., the ratio of rotation 1:1.18), 50 parts by weight of the rubber material and predetermined amounts of sulfur and a vulcanization accelerator were added to the resulting mixture and they were compounded (second-step compounding). The resulting rubber compound was vulcanized at 160° C. for 15 to 20 minutes (press vulcanization), and the properties of the vulcanized rubber were tested. The results are shown in Table 3.

It is seen from the results shown in Table 3 that the compositions obtained in Runs Nos. 18 to 20 and 22 in accordance with this invention showed a much higher rebound than, and an equal or higher wet skid resistance to or than, the compositions obtained in Runs. Nos. 11 to 13 and 15 which are comparisons.

The composition obtained in Run No. 17, a comparison, in Table 3 (containing polybutadiene having a 1,2-bond unit content of 50%) shows a markedly increased rebound as compared with the composition obtained in Run No. 10, a comparison, in Table 3. However, the wet skid resistance of the composition of Run No. 17 is only identical with that of a conventional tire tread composition (Run No. 16, Table 2). Accordingly, fuel cost reduction and wet skid resistance increase were not simultaneously achieved in Run No. 17.

Separately, the two-step compounding process of this invention was performed using various rubber materials consisting of high 1,2-polybutadiene having a 1,2-bond

TABLE 3

| | Comparison | Invention | | | Comparison | Invention |
|---|---|---|---|---|---|---|
| Run No. | 17 | 18 | 19 | 20 | 21 | 22 |
| (1st step compounding) | | | | | | |
| Natural rubber, RSS No. 3 | — | — | — | — | — | 25 |
| cis-1,4-Polyisoprene | 25 | 25 | 25 | 25 | 25 | — |
| Polybutadiene with 50% 1,2-bond unit | 25 | — | — | — | — | — |
| Polybutadiene with 69% 1,2-bond unit | — | 25 | — | — | — | — |
| Polybutadiene with 76% 1,2-bond unit | — | — | 25 | — | — | — |
| Polubutadiene with 88% 1,2-bond unit | — | — | — | 25 | — | 25 |
| Polybutadiene with 93% 1,2-bond unit | — | — | — | — | 25 | — |
| HAF carbon black | 50 | 50 | 50 | 50 | 50 | 50 |
| High aromatic oil | 5 | 5 | 5 | 5 | 5 | 5 |
| Zinc oxide No. 3 | 3 | 3 | 3 | 3 | 3 | 3 |
| Stearic acid | 2 | 2 | 2 | 2 | 2 | 2 |
| Anti-oxidant | 1 | 1 | 1 | 1 | 1 | 1 |
| (2nd step compounding) | | | | | | |
| Natural rubber, RSS No. 3 | — | — | — | — | — | 25 |
| cis-1,4-Polyisoprene | 25 | 25 | 25 | 25 | 25 | — |
| Polybutadiene with 50% 1,2-bond unit | 25 | — | — | — | — | — |
| Polybutadiene with 69% 1,2-bond unit | — | 25 | — | — | — | — |
| Polybutadiene with 76% 1,2-bond unit | — | — | 25 | — | — | — |
| Polybutadiene with 88% 1,2-bond unit | — | — | — | 25 | — | 25 |
| Polybutadiene with 93% 1,2-bond unit | — | — | — | — | 25 | — |
| Sulfur | 1.6 | 1.6 | 1.6 | 1.6 | 1.6 | 1.6 |
| Accelerator | 1.4 | 1.4 | 1.4 | 1.4 | 1.4 | 1.4 |
| Lupke rebound (%) at 25° C. | 60 | 61 | 57 | 56 | 50 | 56 |
| Lupke rebound (%) at 70° C. | 67.5 | 67.5 | 66 | 67.5 | 63.5 | 66.5 |
| Wet skid resistance at 25° C. | 72 | 75 | 78 | 79 | 81 | 77 |
| Pico abrasion ($\times 10^{-2}$ cm$^3$) | 2.30 | 2.82 | 3.00 | 3.23 | 3.34 | 3.22 |
| Tensile strength (kg/cm$^2$) | 220 | 206 | 199 | 188 | 208 | 199 |
| Elongation (%) | 450 | 420 | 400 | 380 | 400 | 390 |
| 300% tensile stress (kg/cm$^2$) | 124 | 125 | 127 | 133 | 131 | 142 | unit content of 76% or 88% and cis-1,4-polyisoprene in various blending weight ratios. Furthermore, the two-step compounding process of this invention was performed by changing the amount of the rubber material used in the first step to 30, 40, 50 (Run No. 20), 60 or 70 parts by weight respectively. The resulting compositions were each vulcanized, and the properties of the vulcanized rubbers were tested. The results are shown in Table 4.

It is seen from the results given in Table 4 that the rebound and the wet skid resistance are well balanced when the constituents and proportions of the rubber material are within the ranges specified in this invention, but that these two properties cannot be balanced if these constituents and proportions are outside the ranges specified in this invention. When the amount of the rubber material used in the first-step compounding is 30 parts by weight which is outside the range specified in this invention, scorching occurs during the compounding and the dispersion of carbon black becomes poor, so that a usable rubber composition cannot be obtained. When the amount of the rubber material used in the first-step compounding was 70 parts by weight which was outside the range specified in this invention, an increase in rebound could not be obtained.

TABLE 4

|  | Invention | | | Comparison | |
|---|---|---|---|---|---|
| Run No. | 23 | 19 | 24 | 25 | 26 |
| (1st step compounding) | | | | | |
| cis-1,4-Polyisoprene | 12.5 | 25 | 37.5 | 40 | 10 |
| Polybutadiene with 76% 1,2-bond unit | 37.5 | 25 | 12.5 | 10 | — |
| Polybutadiene with 88% 1,2-bond unit | — | — | — | — | 40 |
| HAF carbon black | 50 | 50 | 50 | 50 | 50 |
| High aromatic oil | 5 | 5 | 5 | 5 | 5 |
| Zinc oxide No. 3 | 3 | 3 | 3 | 3 | 3 |
| Stearic acid | 2 | 2 | 2 | 2 | 2 |
| Anti-oxidant | 1 | 1 | 1 | 1 | 1 |
| (2nd step compounding) | | | | | |
| cis-1,4-Polyisoprene | 12.5 | 25 | 37.5 | 40 | 10 |
| Polybutadiene with 76% 1,2-bond unit | 37.5 | 25 | 12.5 | 10 | — |
| Polybutadiene with 88% 1,2-bond unit | — | — | — | — | 40 |
| Sulfur | 1.3 | 1.6 | 1.9 | 1.9 | 1.2 |
| Accelerator | 11.7 | 1.4 | 1.1 | 1.1 | 1.8 |
| Lupke rebound (%) at 25° C. | 54 | 57 | 57 | 58 | 48 |
| Lupke rebound (%) at 70° C. | 64 | 66 | 65 | 67 | 60 |
| Wet skid resistance at 25° C. | 79 | 78 | 75 | 72 | 81.5 |
| Pico abrasion ($\times 10^{-2}$ cm$^3$) | 3.32 | 3.00 | 3.22 | 3.20 | 3.50 |
| Tensile strength (kg/cm$^2$) | 185 | 199 | 250 | 260 | 165 |
| Elongation (%) | 380 | 400 | 480 | 490 | 360 |
| 300% tensile modulus (kg/cm$^2$) | 122 | 127 | 132 | 135 | 122 |

|  | Invention | | | Comparison | Invention | | Comparison |
|---|---|---|---|---|---|---|---|
| Run No. | 27 | 20 | 28 | 29 | 30 | 31 | 32 |
| (1st step compounding) | | | | | | | |
| cis-1,4-Polyisoprene | 12.5 | 25 | 37.5 | 15 | 20 | 30 | 35 |
| Polybutadiene with 76% 1,2-bond unit | — | — | — | — | — | — | — |
| Polybutadiene with 88% 1,2-bond unit | 37.5 | 25 | 12.5 | 15 | 20 | 30 | 35 |
| HAF carbon black | 50 | 50 | 50 | 50 | 50 | 50 | 50 |
| High aromatic oil | 5 | 5 | 5 | 5 | 5 | 5 | 5 |
| Zinc oxide No. 3 | 3 | 3 | 3 | 3 | 3 | 3 | 3 |
| Stearic acid | 2 | 2 | 2 | 2 | 2 | 2 | 2 |
| Anti-oxidant | 1 | 1 | 1 | 1 | 1 | 1 | 1 |
| (2nd step compounding) | | | | | | | |
| cis-1,4-Polyisoprene | 12.5 | 25 | 37.5 | 35 | 30 | 20 | 15 |
| Polybutadiene with 76% 1,2-bond unit | — | — | — | — | — | — | — |
| Polybutadiene with 88% 1,2-bond unit | 37.5 | 25 | 12.5 | 35 | 30 | 20 | 15 |
| Sulfur | 1.3 | 1.6 | 1.9 | 1.6 | 1.6 | 1.6 | 1.6 |
| Accelerator | 1.7 | 1.4 | 1.1 | 1.4 | 1.4 | 1.4 | 1.4 |
| Lupke rebound (%) at 25° C. | 52 | 56 | 54 | Compounding impossible | 56.5 | 55 | 49.5 |
| Lupke rebound (%) at 70° C. | 64 | 67.5 | 63 | | 67 | 66 | 60.5 |
| Wet skid resistance at 25° C. | 81 | 79 | 77 | | 79 | 79 | 78 |
| Pico abrasion ($\times 10^{-2}$ cm$^3$) | 3.46 | 3.23 | 3.37 | | 3.36 | 3.15 | 3.20 |
| Tensile strength (kg/cm$^2$) | 171 | 188 | 243 | | 189 | 195 | 190 |
| Elongation (%) | 380 | 380 | 460 | | 380 | 400 | 430 |
| 300% tensile modulus (kg/cm$^2$) | 126 | 133 | 135 | | 132 | 129 | 118 |

EXAMPLE 2

In the same way as in Example 1, each of various polybutadiene having a 1,2-bond unit content was compounded with carbon black, a process oil and other materials, and then cis-1,4-polyisoprene was further added and compounded. The resulting compositions were vulcanized and the properties of the vulcanizates were determined. The results are shown in Table 5.

TABLE 5

| Run No. | Comparison 33 | Invention 34 | Invention 35 | Invention 36 | Comparison 37 | Comparison 38 | Invention 39 | Invention 40 | Comparison 41 |
|---|---|---|---|---|---|---|---|---|---|
| (1st step compounding) | | | | | | | | | |
| cis-1,4-Polyisoprene | — | — | — | — | — | 50 | — | — | — |
| Polybutadiene with 50% 1,2-bond unit | 50 | — | — | — | — | — | — | — | — |
| Polybutadiene with 69% 1,2-bond unit | — | 50 | — | — | — | — | — | — | — |
| Polybutadiene with 76% 1,2-bond unit | — | — | 50 | — | — | — | — | — | — |
| Polybutadiene with 88% 1,2-bond-unit | — | — | — | 50 | — | — | 50 | 50 | 50 |
| Polybutadiene with 93% 1,2-bond unit | — | — | — | — | 50 | — | — | — | — |
| HAF carbob black | 50 | 50 | 50 | 50 | 50 | 50 | 50 | 50 | 50 |
| High aromatic oil | 5 | 5 | 5 | 5 | 5 | 5 | 5 | 5 | 5 |
| Zinc oxide No. 3 | 3 | 3 | 3 | 3 | 3 | 3 | 3 | 3 | 3 |
| Stearic acid | 2 | 2 | 2 | 2 | 2 | 2 | 2 | 2 | 2 |
| Anti-oxidant | 1 | 1 | 1 | 1 | 1 | 1 | 1 | 1 | 1 |
| (2nd step compounding) | | | | | | | | | |
| cis-1,4-Polyisoprene | 50 | 50 | 50 | 50 | 50 | — | 30 | 20 | 10 |
| cis-1,4-Polyisoprene | — | — | — | — | — | — | 20 | 30 | 40 |
| Polybutadiene with 88% 1,2-bond unit | — | — | — | — | — | 50 | — | — | — |
| Sulfur | 1.6 | 1.6 | 1.6 | 1.6 | 1.6 | 1.6 | 1.48 | 1.42 | 1.36 |
| Accelerating agent | 1.4 | 1.4 | 1.4 | 1.4 | 1.4 | 1.4 | 1.48 | 1.50 | 1.52 |
| Lupke rebound (%) at 25° C. | 60 | 61 | 59 | 57 | 51 | 53 | 56 | 57 | 58 |
| 70° C. | 67.5 | 68 | 68 | 69 | 65 | 63 | 67 | 66 | 64 |
| Wet skid resistance at 25° C. | 72 | 75 | 78 | 79 | 81 | 78 | 75.5 | 74.5 | 72 |
| Pico abrasion ($\times 10^{-2}$ cm$^3$) | 2.28 | 2.76 | 3.20 | 3.24 | 3.41 | 3.19 | 2.58 | 2.63 | 2.10 |
| Tensile strength (kg/cm$^2$) | 240 | 243 | 216 | 221 | 214 | 218 | 180 | 165 | 161 |
| Elongation (%) | 460 | 480 | 420 | 430 | 380 | 410 | 340 | 330 | 310 |
| 300% tensile stress (kg/cm$^2$) | 139 | 135 | 136 | 133 | 156 | 131 | 128 | 125 | 124 |

It is seen from Table 5 that rebound is markedly high and wet skid resistance is also high in Runs Nos. 34 to 36 (in which the 1,2-bond content was 65 to 90%) which correspond respectively to Runs Nos. 11 to 13 in Example 1.

No marked increase in rebound was seen in the composition of Run No. 38 (comparison) which was obtained by compounding cis-1,4-polyisoprene with carbon black and a process oil, and then additionally compounding high 1,2-polybutadiene (1,2-bond unit content 88%) with the resulting mixture, in spite of the fact that the final chemical composition of the rubber compound in Run No. 38 was the same as that in Run No. 36 (invention). It is clearly seen from this that the effects of this invention can be exhibited by compounding the high 1,2-polybutadiene in the first step.

Furthermore, from the results obtained in Runs Nos. 39 to 41 in which a part of cis-1,4-polyisoprene was replaced by cis-1,4-polybutadiene in the second compounding step, it is seen that according to this invention, abrasion resistance can be increased while maintaining a balance between rebound and wet skid resistance at a high level.

EXAMPLE 3

By the same method as in Example 1, polybutadiene having a 1,2-bond unit content of 76% and cis-1,4-polyisoprene (and cis-1,4-polybutadiene) were blended in accordance with the recipes and compounding methods shown in Table 6. The resulting compounds were press-cured at 160° C. for 10 to 25 minutes, and the properties of the vulcanizates were measured. The results are shown in Table 6.

TABLE 6

| Run No. | Invention 42 | Invention 43 | Invention 44 | Invention 45 | Invention 46 | Invention 47 | Invention 48 | Invention 49 |
|---|---|---|---|---|---|---|---|---|
| Compounding recipe | | | | | | | | |
| (1st step compounding) | | | | | | | | |
| Polybutadiene with 76% 1,2-bond unit | 50 | 50 | 50 | 40 | 40 | 30 | 30 | 30 |
| cis-1,4-Polyisoprene | — | — | — | 10 | 10 | 20 | 10 | 10 |
| cis-1,4-Polybutadiene | — | — | — | — | — | — | 10 | 10 |
| HAF carbon black | 50 | 50 | 50 | 50 | 50 | 50 | 50 | 50 |
| High aromatic oil | 5 | 5 | 5 | 5 | 5 | 5 | 5 | 5 |
| Zinc oxide No. 3 | 3 | 3 | 3 | 3 | 3 | 3 | 3 | 3 |
| Stearic acid | 2 | 2 | 2 | 2 | 2 | 2 | 2 | 2 |
| Anti-oxidant | 1 | 1 | 1 | 1 | 1 | 1 | 1 | 1 |
| Sulfur | — | 0.75 | 1.5 | — | 0.75 | — | — | 0.75 |
| (2nd step compounding) | | | | | | | | |
| Polybutadiene with 76% 1,2-bond unit | — | — | — | 10 | 10 | 20 | 20 | 20 |

TABLE 6-continued

| Run No. | Invention | | | | | | | |
|---|---|---|---|---|---|---|---|---|
| | 42 | 43 | 44 | 45 | 46 | 47 | 48 | 49 |
| cis-1,4-Polyisoprene | 50 | 50 | 50 | 40 | 40 | 30 | 20 | 20 |
| cis-1,4-Polybutadiene | — | — | — | — | — | — | 10 | 10 |
| Vulcanization accelerator | 64 | 1.4 | 1.4 | 1.4 | 1.4 | 1.4 | 1.4 | 1.4 |
| Sulfur | 1.5 | 0.75 | — | 1.5 | 0.75 | 1.5 | 1.5 | 0.75 |
| Properties of Vulcanizates | | | | | | | | |
| Lupke rebound (%) at 23° C. | 59 | 62 | 64 | 59 | 61 | 58 | 59 | 62 |
| at 70° C. | 68 | 72 | 73 | 69 | 71 | 68 | 68 | 70 |
| Wet skid resistance at 25° C. | 78 | 80 | 81 | 78 | 80 | 78 | 78 | 78 |
| Pico abrasion ($\times 10^{-2}$ cm$^3$) | 3.10 | 3.08 | 3.07 | 2.93 | 2.90 | 3.03 | 2.85 | 2.83 |
| Tensile strength (kg/cm$^2$) | 226 | 235 | 239 | 219 | 211 | 220 | 195 | 193 |
| Elongation (%) | 430 | 420 | 420 | 420 | 410 | 420 | 390 | 380 |
| 300% tensile stress (kg/cm$^2$) | 135 | 138 | 140 | 134 | 136 | 134 | 128 | 129 |

It is seen from Table 6 that by adding sulfur in the first compounding step in an amount corresponding to 100% or 50% of the required amount, rebound and wet skid resistance can be further enhanced.

What we claim is:

1. A process for preparing a tire tread rubber composition having improved rolling resistance and wet skid resistance comprising [I] 100 parts by weight of a rubber material composed of 25 to 75% by weight of substantially amorphous polybutadiene having a 1,2-bond unit content of 65 to 90 mole% and a Mooney viscosity ($ML_{1+4}$, 100° C.) of 20 to 100 and 75 to 25% by weight of natural rubber and/or cis-1,4-polyisoprene, and [II] 40 to 70 parts by weight of carbon black, said process comprising (1) mechanically compounding 40 to 60 parts by weight of the rubber material [I] with 40 to 70 parts by weight of carbon black [II], and then (2) adding to the resulting mixture 60 to 40 parts by weight of the rubber material [I] and 30 to 0 parts by weight of carbon black [II] so that the final amount of rubber material (I) is adjusted to 100 parts by weight and the final amount of the carbon black [II] is adjusted to 40 to 70 parts by weight respectively, and mechanically compounding them.

2. The process of claim 1 wherein not more than 65% by weight of the natural rubber and/or cis-1,4-polyisoprene is replaced by a conjugated diene rubber.

3. The process of claim 2 wherein said conjugated diene rubber is cis-1,4-polybutadiene.

4. The process of claim 1 wherein said rubber material [I] is composed of the substantially amorphous polybutadiene and natural rubber.

5. The process of claim 1 wherein said rubber material [I] is composed of the substantially amorphous polybutadiene and cis-1,4-polyisoprene.

6. The process of claim 1 wherein said rubber material [I] is composed of the substantially amorphous polybutadiene, natural rubber and cis-1,4-polyisoprene.

7. The process of claim 1 wherein the substantially amorphous polybutadiene has a 1,2-bond unit content of 69 to 88 mole%.

8. The process of claim 1 wherein the substantially amorphous polybutadiene has a Mooney viscosity in the range of 30 to 80.

* * * * *